US010775288B1

United States Patent
Bellemare et al.

(10) Patent No.: US 10,775,288 B1
(45) Date of Patent: Sep. 15, 2020

(54) STYLUS ENGAGEMENT MECHANISM FOR CONTACT MECHANICS TESTERS

(71) Applicant: Massachusetts Materials Technologies LLC, Somerville, MA (US)

(72) Inventors: Simon C. Bellemare, Weston, MA (US); Brendon M. Willey, Dedham, MA (US); Kotaro Taniguchi, Rockland, ME (US)

(73) Assignee: Massachusetts Materials Technologies LLC, Waltham, MA (US)

( * ) Notice: Subject to any disclaimer, the term of this patent is extended or adjusted under 35 U.S.C. 154(b) by 247 days.

(21) Appl. No.: 15/935,417

(22) Filed: Mar. 26, 2018

Related U.S. Application Data

(63) Continuation-in-part of application No. 15/256,276, filed on Sep. 2, 2016, now Pat. No. 9,933,346, which is a continuation-in-part of application No. 15/061,415, filed on Mar. 4, 2016, now Pat. No. 9,897,523, and a continuation-in-part of application No. 14/310,611, filed on Jun. 20, 2014, now Pat. No. 9,778,158.

(60) Provisional application No. 62/476,494, filed on Mar. 24, 2017, provisional application No. 62/270,416, filed on Dec. 21, 2015, provisional application No. 62/237,950, filed on Oct. 6, 2015, provisional
(Continued)

(51) Int. Cl.
*G01N 3/46* (2006.01)
*G01N 3/60* (2006.01)

(52) U.S. Cl.
CPC .................. *G01N 3/46* (2013.01); *G01N 3/60* (2013.01); *G01N 2203/0032* (2013.01); *G01N 2203/0078* (2013.01); *G01N 2203/06* (2013.01)

(58) Field of Classification Search
CPC .. G01N 3/46; G01N 3/42; G01N 3/48; G01N 3/56; G01N 3/60; G01N 3/30; G01N 2203/0032; G01N 2203/0078; G01N 2203/06; G01N 19/02; G01N 19/04; G06F 17/5018; G01Q 60/24; B23Q 17/09; G01B 5/20; G01B 11/30; G01M 7/00
See application file for complete search history.

(56) References Cited

U.S. PATENT DOCUMENTS

| 4,852,397 A | 8/1989 | Haggag |
| 5,686,652 A | 11/1997 | Pfund |

(Continued)

FOREIGN PATENT DOCUMENTS

| JP | 2002506221 A | 2/2002 |
| WO | 0216907 A1 | 2/2002 |

OTHER PUBLICATIONS

European Patent Office, Extended European Search Report, Application No. 14814061.9, dated Jan. 30, 2017, 8 pages.
(Continued)

*Primary Examiner* — Harshad R Patel
*Assistant Examiner* — Nigel H Plumb
(74) *Attorney, Agent, or Firm* — Sunstein LLP

(57) ABSTRACT

An apparatus for performing a contact mechanics test by engaging multiple styluses with a substrate through a contact load that is applied by a load applicator and transferred to the styluses through a stylus load transfer mechanism. This apparatus allows the styluses to be positioned in close proximity to allow for a smaller and more compact apparatus, with less uncertainty on the magnitude of the engagement load being applied to each stylus. Ultimately, this provides a more portable apparatus for testing of material properties.

20 Claims, 13 Drawing Sheets

Related U.S. Application Data application No. 62/128,753, filed on Mar. 5, 2015, provisional application No. 61/837,724, filed on Jun. 21, 2013.

(56) References Cited

U.S. PATENT DOCUMENTS

| | | | |
|---|---|---|---|
| 5,866,807 | A | 2/1999 | Elings et al. |
| 6,401,349 | B1 | 6/2002 | Onyon |
| 6,520,004 | B1 | 2/2003 | Lin |
| 6,718,820 | B2 | 4/2004 | Kwon et al. |
| 7,302,831 | B2 | 12/2007 | Moyse et al. |
| 7,685,868 | B2 | 3/2010 | Woirgard et al. |
| 8,215,163 | B2 | 7/2012 | Zhang |
| 8,375,774 | B2 | 2/2013 | Seok et al. |
| 9,778,158 | B2 | 10/2017 | Bellemare et al. |
| 9,897,523 | B2 | 2/2018 | Bellemare et al. |
| 9,933,346 | B2 | 4/2018 | Bellemare et al. |
| 2004/0011119 | A1 | 1/2004 | Jardret et al. |
| 2006/0150710 | A1 | 7/2006 | Moyse et al. |
| 2006/0174699 | A1 | 8/2006 | Hicks et al. |
| 2006/0191327 | A1 | 8/2006 | Yang et al. |
| 2007/0227236 | A1 | 10/2007 | Bonilla et al. |
| 2008/0028840 | A1 | 2/2008 | Smith et al. |
| 2009/0145208 | A1 | 6/2009 | Coudert et al. |
| 2009/0260415 | A1 | 10/2009 | Suarez-Rivera et al. |
| 2012/0085154 | A1 | 4/2012 | Takemura et al. |
| 2014/0373608 | A1 | 12/2014 | Bellemare et al. |
| 2016/0153881 | A1 | 6/2016 | Bellaton et al. |
| 2016/0258852 | A1 | 9/2016 | Bellemare et al. |

OTHER PUBLICATIONS

International Searching Authority, International Search Report and Written Opinion, International Application No. PCT/US2014/043498 dated Oct. 16, 2014, 17 pages.

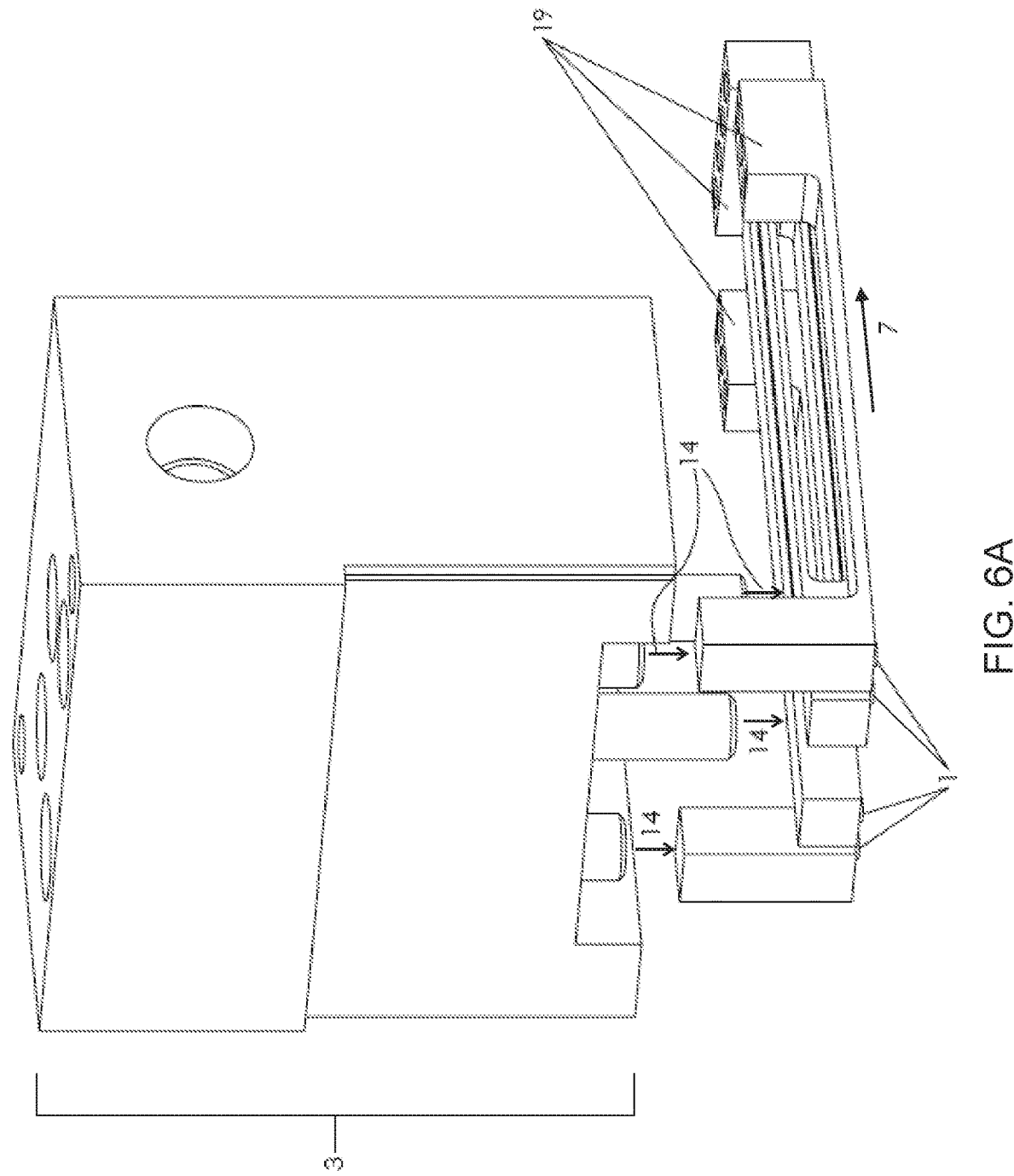

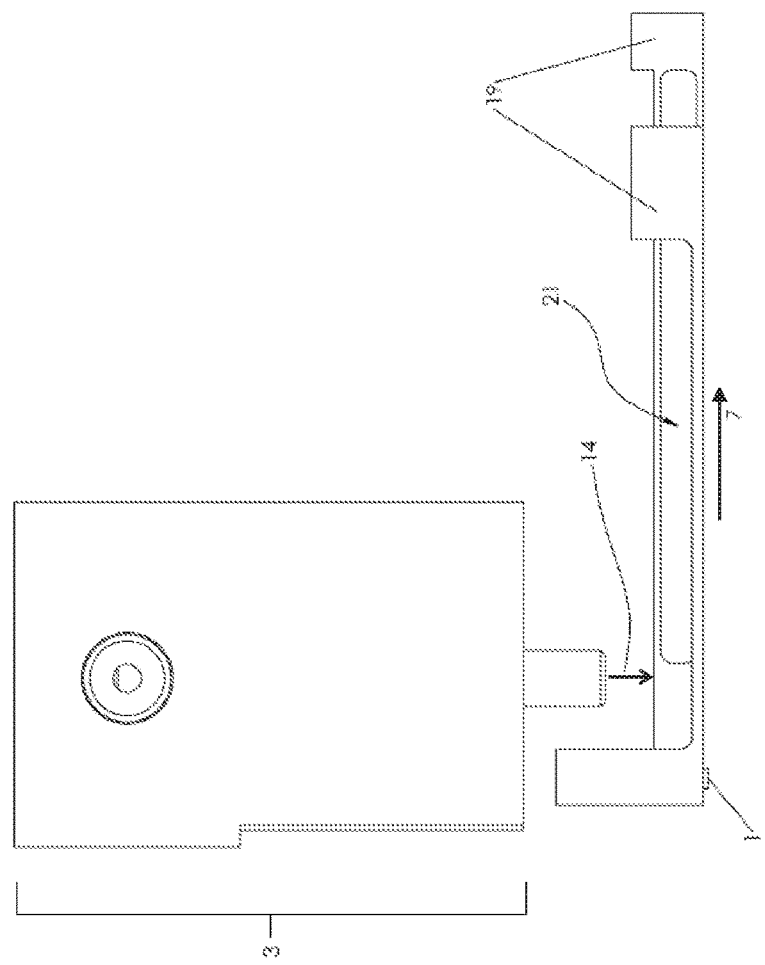
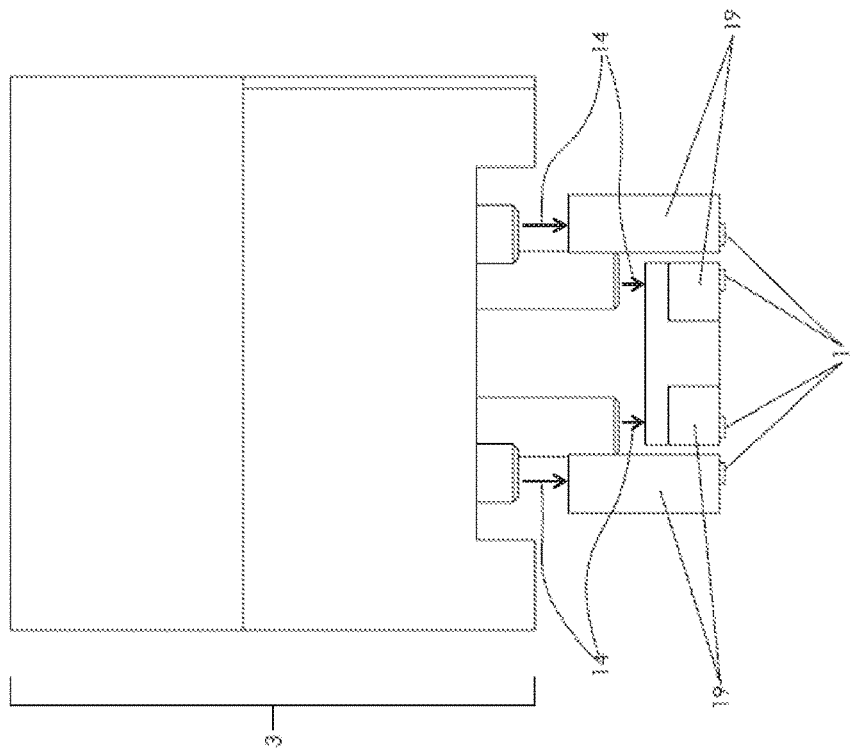
FIG. 6B
FIG. 6C

STYLUS ENGAGEMENT MECHANISM FOR CONTACT MECHANICS TESTERS

CROSS REFERENCE TO RELATED APPLICATIONS

This patent application claims the benefit of U.S. Provisional Patent Application No. 62/476,494 filed Mar. 24, 2017. This patent application is also a continuation-in-part of U.S. patent application Ser. No. 15/256,276 filed Sep. 2, 2016, now U.S. Pat. No. 9,933,346, which is a continuation-in-part application of U.S. patent application Ser. No. 15/061,415 filed Mar. 4, 2016, now U.S. Pat. No. 9,897,523, which claims the benefit of U.S. Provisional Patent Application No. 62/128,753 filed Mar. 5, 2015, U.S. Provisional Patent Application No. 62/237,950 filed Oct. 6, 2015, and U.S. Provisional Patent Application No. 62/270,416 filed Dec. 21, 2015. U.S. patent application Ser. No. 15/256,276 is also a continuation-in-part application of U.S. patent application Ser. No. 14/310,611, filed Jun. 20, 2014, now U.S. Pat. No. 9,778,158, which claims the benefit of U.S. Provisional Patent Application No. 61/837,724 filed Jun. 21, 2013.The disclosures of the above applications and patents are incorporated by reference herein in their entirety.

TECHNICAL FIELD

The present invention relates to the implementation and design of a contact mechanics testing apparatus that can be used to gain data and information related to material state and properties, and more specifically to the sampling of material surface characteristics, including mechanical behavior, without requiring the use of conventional cutting or machining tools to remove a sample from an existing structure, component or product.

BACKGROUND ART

Engineers and other decision-making agents utilize data about the materials of fabrication for load bearing structures to determine their durability, reliability and the overall safety. The data can be from a number of sources including the original manufacturing specifications, from manufacturing quality control, or from measurements done after the fact as part of condition assessment. Nondestructive testing (NDT) methods are appealing because they allow for estimating the characteristics and properties of assemblies and structures without damaging or jeopardizing the function of the structure during testing.

Nondestructive testing during condition assessment on existing structures in the field is very important to safety and the protection of the environment. We have a large inventory of existing infrastructures that may have changed from the time they were originally manufactured as well as existing infrastructures that would not meet the current standards of design and fabrication. One goal with condition assessment is to minimize the risk of a catastrophic event such as the break of a large oil or gas pipeline, the collapse of a bridge or the failure of a large pressure vessel. These events still occur too frequently in our society.

Nondestructive testing can be used to evaluate, among others, the existence and size of cracks, changes in material thickness for corrosion, and the properties of the materials. Properties of the materials that can be of interest include the chemistry, mechanical properties and the cracking resistance under the service environment and/or the cyclic loads.

Nondestructive techniques for mechanical properties have proven capable of measuring the hardness, strength, and ductility of a material by utilizing a form of indentation referred to as frictional sliding, whereby a stylus is indented into a substrate and displaced laterally across the substrate surface. To determine the material properties, the stylus reaction forces and its relative displacement are monitored throughout the test. While the mechanisms of this process are well studied, implementation was previously difficult due to sample surface curvature, as well as situations in field environments during which a sample could not be removed and the material had to be tested in-situ (i.e., bridge, pipelines, sub-frames).

Recent industrial innovations by Bellemare et al., as outlined in U.S. Pat. No. 9,933,346, have enabled the utilization of these contact mechanics techniques in field conditions. One of the limitations in the apparatus described in U.S. Pat. No. 9,933,346, however, is the mechanical space required for implementing multiple styluses within one apparatus, a technique that has proven value in testing accuracy. Each stylus, which remains independent from the others due to the nature of the test, requires independent load application, alignment, and monitoring. As each of the components requires significant space, the size of the device can become unwieldy.

SUMMARY OF THE EMBODIMENTS

In one embodiment of the invention, an apparatus for performing a contact mechanics test on a substrate includes two or more styluses, located adjacent to one another, each stylus shaped to deform the substrate at a stylus contact location, at least one load applicator configured to induce a contact load to the two or more styluses, and a stylus load transfer mechanism, coupled to each stylus and coupled to at least one load applicator, configured to transfer the contact load from at least one load applicator to its respective coupled stylus.

In related embodiments, one load applicator may be coupled to each stylus load transfer mechanism, so that each load applicator induces the contact load to one stylus. One or more coupled components may be contiguous. The coupled components may include one stylus and at least one load applicator, at least one load applicator and one stylus load transfer mechanism, and/or one stylus and one stylus load transfer mechanism. The load applicators may be situated distally from the two or more styluses. The stylus load transfer mechanism may be a lateral extension coupled to its respective stylus. The stylus load transfer mechanism may be a pivoting stylus load transfer mechanism. In this case, the apparatus may further include a rotational attachment, coupled to two or more adjacent pivoting stylus load transfer mechanisms, configured to provide an axis of rotation for the adjacent pivoting stylus load transfer mechanisms. The stylus load transfer mechanism may be a flexure stylus load transfer mechanism configured to allow for movement of its respective coupled stylus perpendicular to a surface of the substrate. The apparatus may further include a load splitting mechanism, coupled to at least one load applicator and two or more stylus load transfer mechanisms, configured to transfer the contact load from at least one load applicator to the two or more stylus load transfer mechanisms. The apparatus may further include an indirect stylus load transfer mechanism, coupled to each stylus load transfer mechanism, configured to transfer the contact load from at least one load applicator to the respective stylus coupled to its respective stylus load transfer mechanism. At least one load applicator may include an hydraulic system, a pneumatic system, a mechanical spring system, and/or a linear actuator.

BRIEF DESCRIPTION OF THE DRAWINGS

The foregoing features of embodiments will be more readily understood by reference to the following detailed description, taken with reference to the accompanying drawings, in which:

FIGS. 6A-6C depict schematic views of the stylus engagement apparatus of FIG. 1 with flexure stylus load transfer mechanisms according to embodiments of the present invention.

DETAILED DESCRIPTION OF SPECIFIC EMBODIMENTS

Definitions. As used in this description and the accompanying claims, the following terms shall have the meanings indicated, unless the context otherwise requires:

A "stylus" is an element engaging a substrate. The stylus geometry may be conical, spherical, 3-sided pyramid, 4-sided pyramid, wedge-shaped, or a combination thereof A "load applicator" is a device that is capable of developing a load between two points. A load applicator may include hydraulics, pneumatics, springs, linear actuators, motors, gears, magnets, or a combination of two or more.

A "stylus load transfer mechanism" is an element or assembly of elements that transfers the desired loads from one or more load applicators to one or more styluses. For a specific application, one or more load transfer mechanisms may be used separately or in series to accomplish the transfer of load.

A "pivoting stylus load transfer mechanism" is an element that is configured to rotate about a fulcrum.

A "flexure stylus load transfer mechanism" is an element that is configured to have a cross-sectional geometry that minimizes the bending stiffness.

An "indirect stylus load transfer mechanism" is an element that is not directly coupled to the load applicator, but is coupled to the stylus. An indirect stylus load transfer mechanism is used as part of a series of stylus load transfer mechanisms to decouple the load applicator from frictional stylus forces. This element can be a pivoting or flexure stylus load transfer mechanism.

A "load splitting mechanism" is an element or assembly of elements that transfers the load from a load applicator to two or more stylus load transfer mechanisms.

The embodiments of the stylus engagement mechanism disclosed herein represent significant improvements to traditional methods of stylus load application. Due to the size, weight, and speed restrictions demanded by field implementation of a contact mechanics testing apparatus, alternative techniques were necessary. The stylus load transfer mechanism enables styluses, which have generally small and manageable geometries, and load applicators, which can become quite large for high-load applications, to be affixed remotely, while still allowing the two components to interact as necessary for a contact mechanics test.

Figure 1:
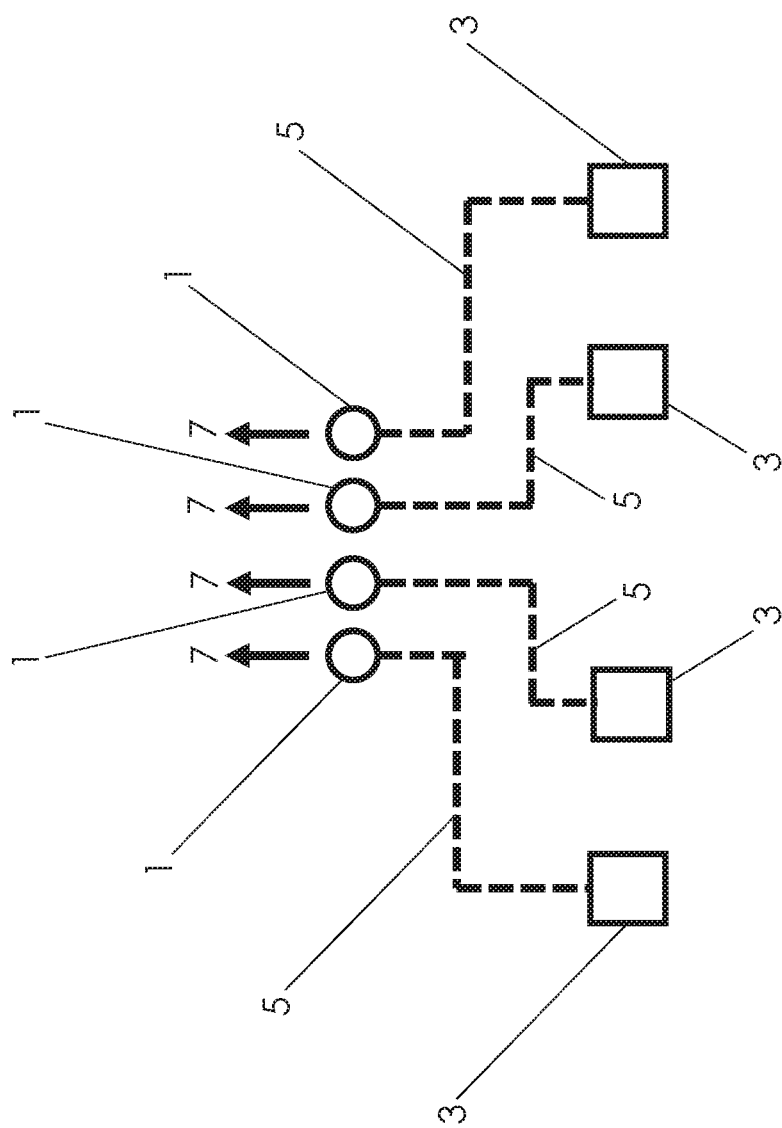
FIG. 1 depicts a schematic illustration of a top view of the relative connection of stylus engagement apparatus components according to exemplary embodiments.

In one embodiment, the stylus engagement mechanism includes two or more styluses, each stylus is coupled to a load applicator by a stylus load transfer mechanism. As shown in FIG. 1, as the number of styluses 1 increases, in this embodiment to four, the number of load applicators 3 and stylus load transfer mechanisms 5 may also increase proportionally, although one load applicator 3 may be used for two or more stylus load transfer mechanisms 5, as described in more detail below. The direction of motion 7 is shown to illustrate that the stylus path trajectories do not overlap. As the number of styluses 1 increases, the advantages of the stylus load transfer mechanism 5 are that the styluses 1 may be arranged close and adjacent to each other while the one or more load applicators 3 can be remote and spaced apart, in order to prevent overcomplicated design, while still providing sufficient load for the contact mechanics test.

Figure 2B:
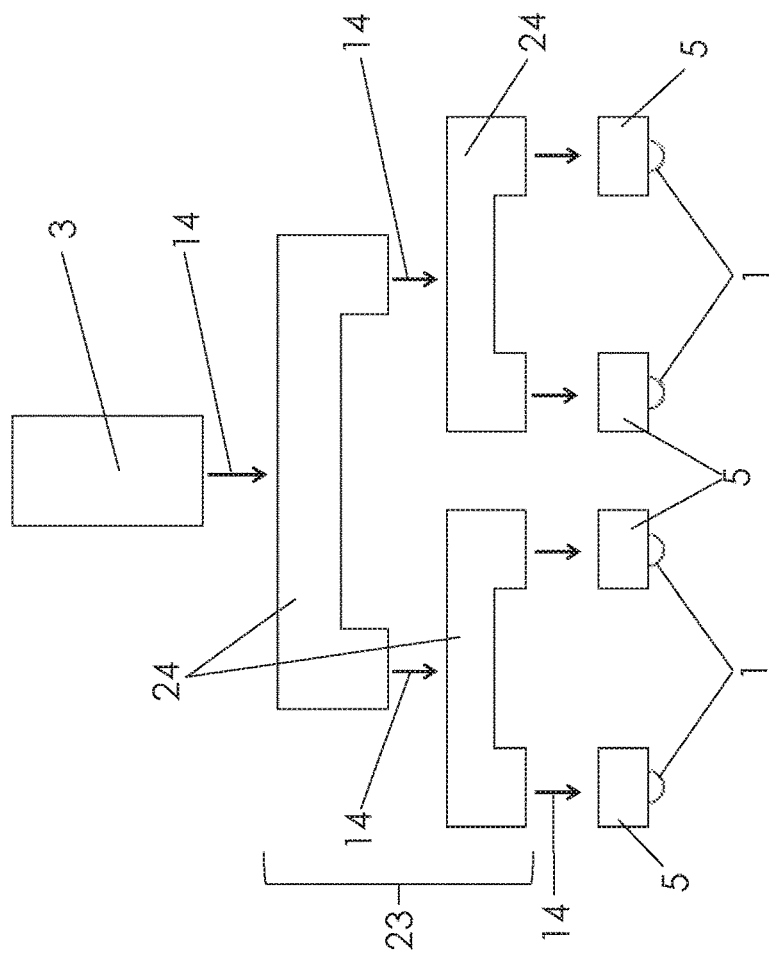
FIGS. 2A-2B depict a schematic of a load splitting mechanism according to embodiments of the present invention.
Figure 2A:
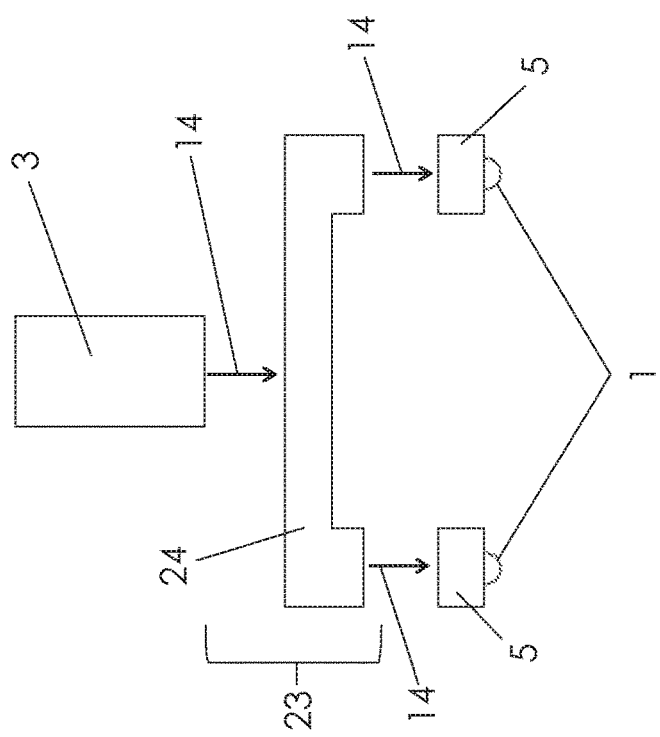
Figure 4A:
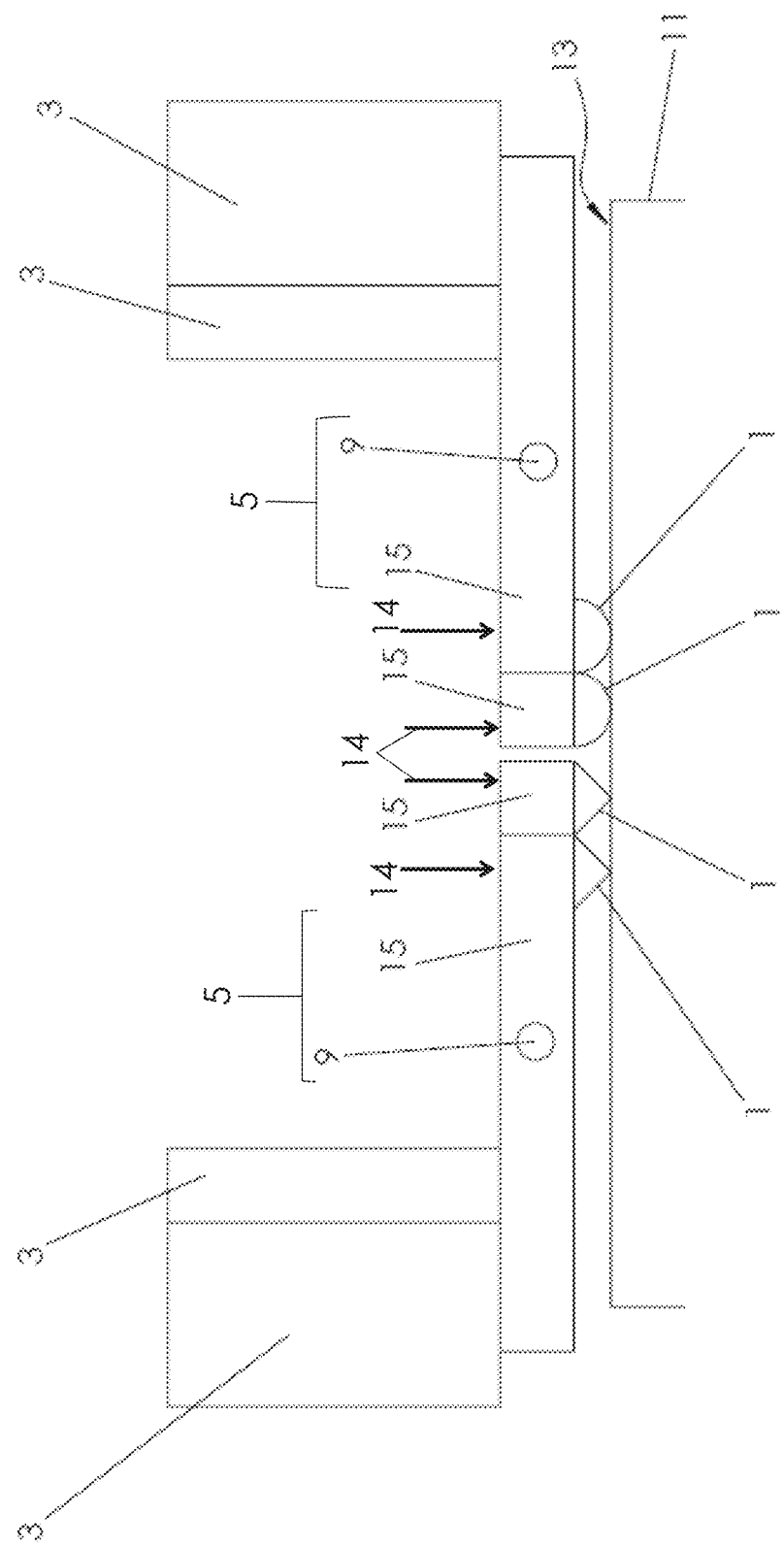
FIG. 4A depicts a schematic side view and FIG. 4B depicts a schematic perspective view of the stylus engagement apparatus with pivoting stylus load transfer mechanisms according to embodiments of the present invention.
Figure 4B:
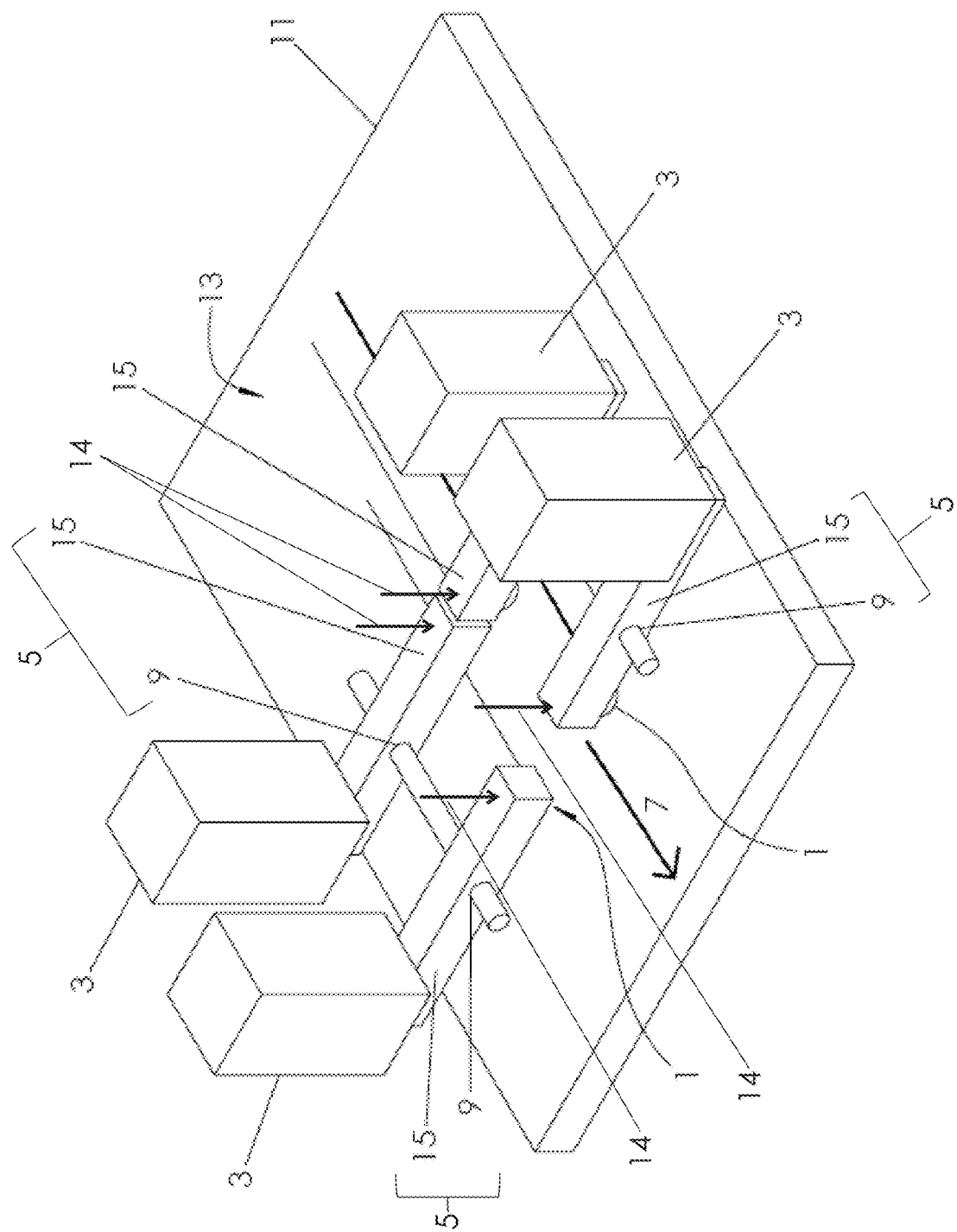

One load applicator 3 may apply an engagement load 14 to one of the stylus load transfer mechanisms 5, as shown in FIGS. 4A and 4B and described in more detail below. Alternatively, one load applicator 3 may apply an engagement load 14 to two or more stylus load transfer mechanisms 5 by using a load splitting mechanism 23, as shown in FIGS. 2A and 2B. FIG. 2A shows one load splitting mechanism 23, shown as a whippletree member 24, used to transfer the engagement load 14 to two stylus load transfer mechanisms 5, and each stylus load transfer mechanism 5 is coupled to one stylus 1. FIG. 2B shows two or more load splitting mechanism 23, shown as whippletree members 24, used to transfer the engagement load 14 from one load applicator 3 to four stylus load transfer mechanisms 5. FIGS. 2A and 2B show the engagement load 14 centered on the whippletree member 24, but an eccentric configuration could also be used to allow for different engagement loads 14 to be applied for each stylus load transfer mechanism 5. These principles can be used to split the engagement load 14 for additional configurations of whippletree members 24 and engagement load 14 application positions.

Figure 3B:
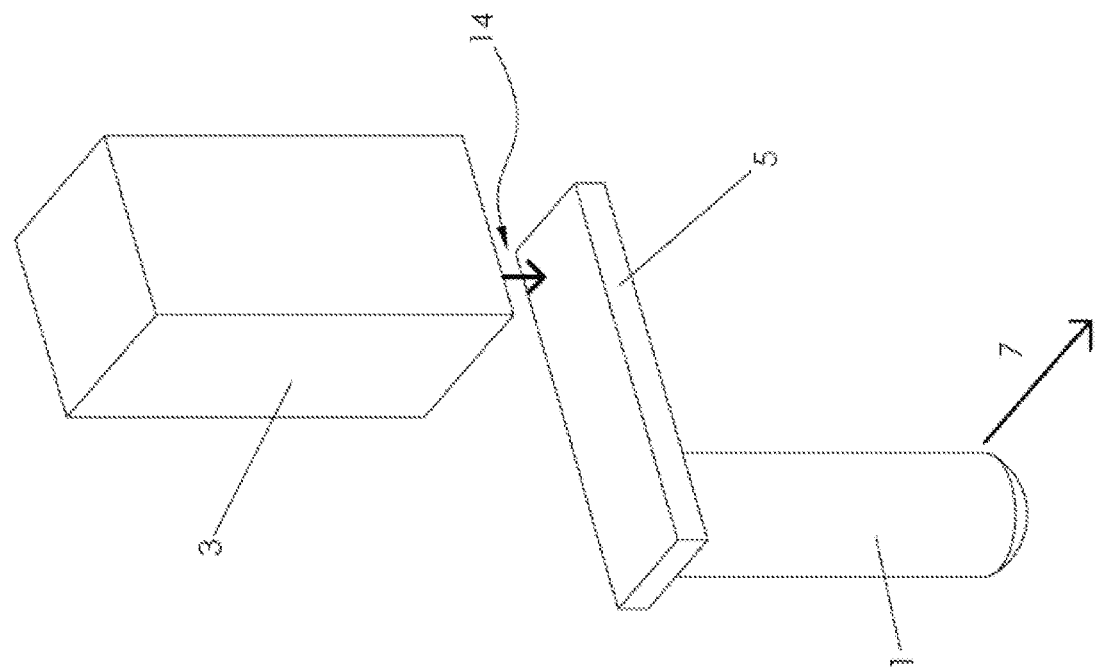
FIG. 3A depicts a schematic side view and FIG. 3B depicts a schematic perspective view of the stylus engagement apparatus.
Figure 3A:
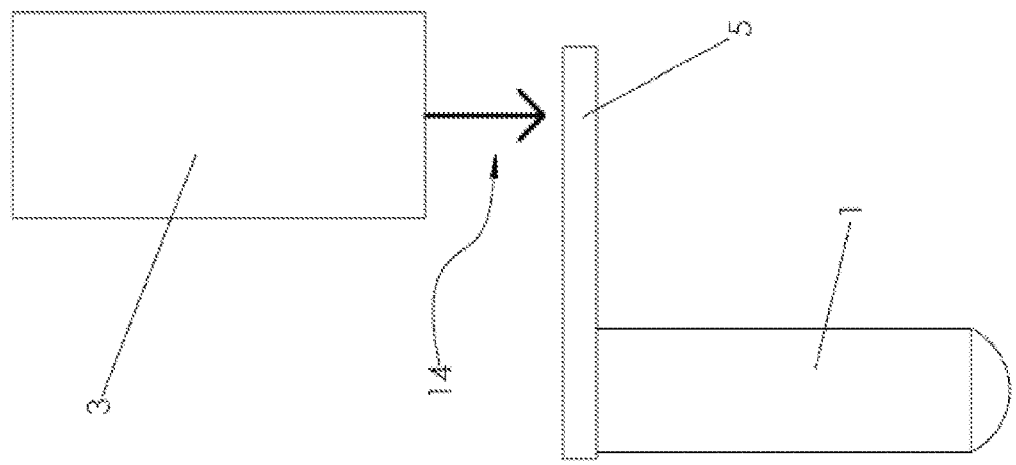
Figure 3C:
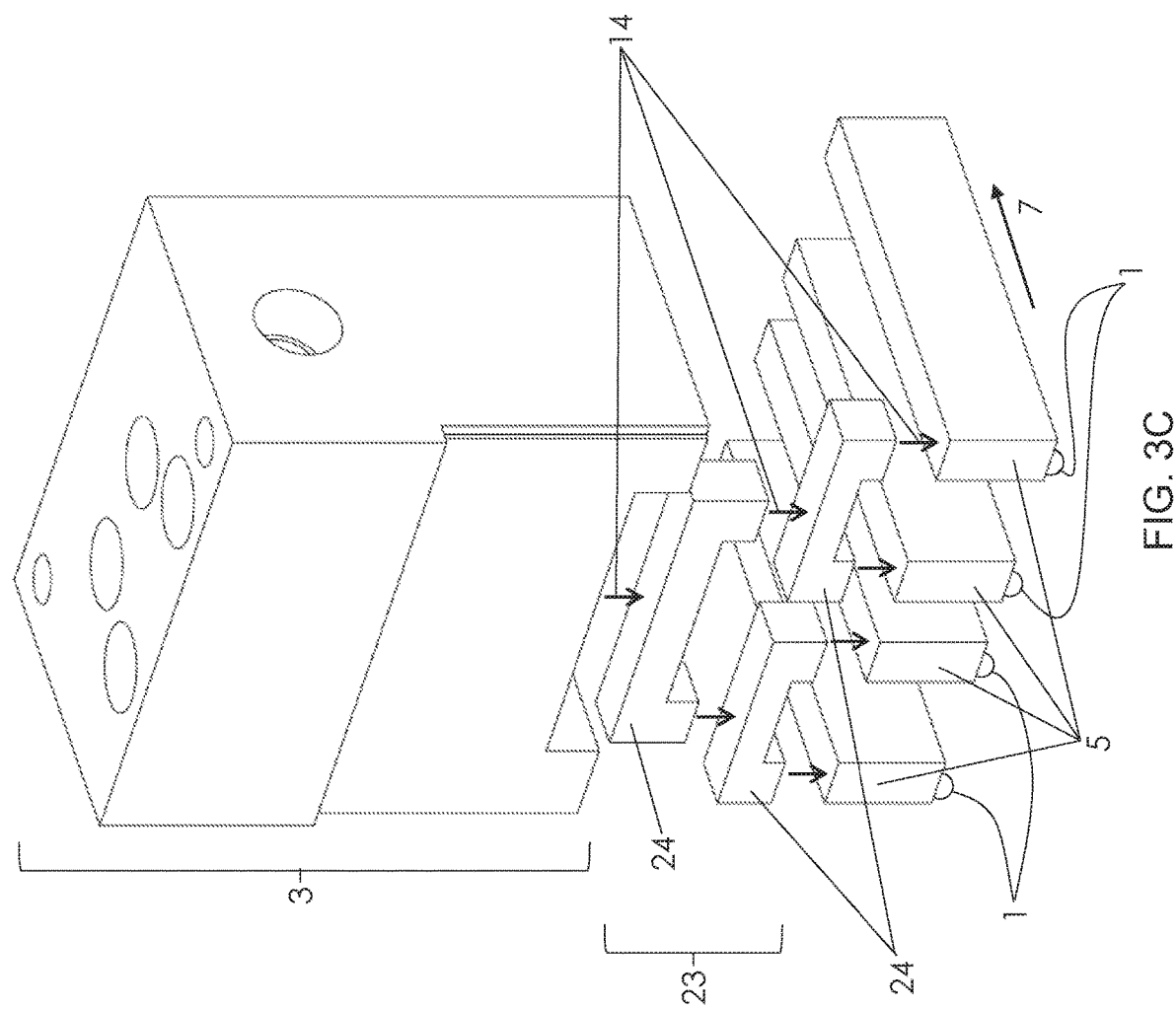
FIG. 3C depicts a schematic perspective view of the stylus engagement apparatus configured with a load splitting mechanism according to embodiments of the present invention.

As shown in FIGS. 3A-3B, the stylus load transfer mechanism 5 may be a lateral extension coupled to the stylus 1. In this embodiment, the stylus 1 and stylus load transfer mechanism 5 are contiguous. This embodiment is a simple way to allow the load applicator 3 to apply an engagement load 14 to the stylus 1 at an offset location. However, as the offset distance increases, the moment that must be absorbed by a translational attachment (not shown), increases significantly, which can damage the stylus engagement mechanism. Generally, translational attachments, such as a linear bearing, which may be mounted in a core and used to guide the vertical motion of the stylus toward or away from the substrate, are not designed to operate under significant moments. In addition, or alternatively, the stylus load transfer mechanism 5 may be a lateral extension coupled to the load applicator 3 (not shown). In this embodiment, the load applicator 3 and stylus load transfer mechanism 5 are contiguous. FIG. 3C shows a stylus engagement mechanism with two or more load splitting mechanisms 23 (shown as whippletree members 24), that transfer the engagement load 14 from a load applicator 3 to multiple stylus load transfer mechanisms 5.

As shown in FIGS. 4A-4B, one load applicator 3 may be used for each of the stylus load transfer mechanisms 5 to apply loads to each of the styluses 1. The stylus load transfer mechanism 5 may be a pivoting stylus load transfer mechanism 15, which may be rotationally coupled to one or more adjacent pivoting stylus load transfer mechanisms 15 with a rotational attachments 9. In FIGS. 4A and 4B, there are four styluses 1 shown, although there may be two or more styluses, and the styluses 1 and pivoting stylus load transfer mechanism 15 are contiguous, though they may be independent. The pivoting stylus load transfer mechanisms 15 are mounted to the contact mechanics tester apparatus such that the rotation axes of the rotational attachments 9 are parallel to the direction of movement 7. In this parallel configuration, the rotational attachments 9 carry the frictional reaction forces experienced by the styluses 1 without altering the stylus engagement load between the stylus 1 and substrate surface 13 as applied by the load applicator 3. The advantage to this configuration is that the pivoting stylus load transfer mechanisms 15 allow the load applicators 3 to operate remotely, and the distance between styluses 1, and subsequent residual substrate surfaces, to be significantly reduced. Compared to the embodiment shown in FIGS. 3A-3C, this embodiment removes the friction errors caused by applying a moment to a translational attachment, such as a linear bearing, as well as allows for much greater offset distances, which may significantly reduce the overall height of the contact mechanics tester apparatus.

Figure 5A:
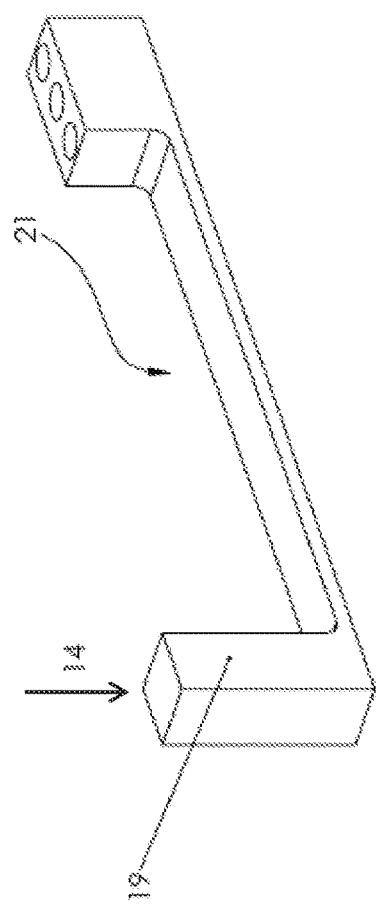
FIGS. 5A-5F depict schematic views of flexure stylus load transfer mechanisms according to embodiments of the present invention.
Figure 5B:
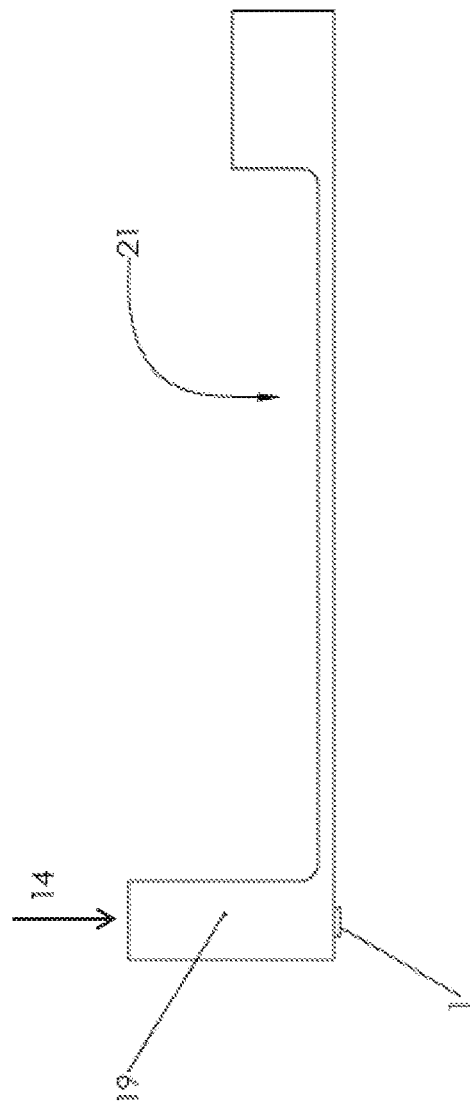
Figure 5C:
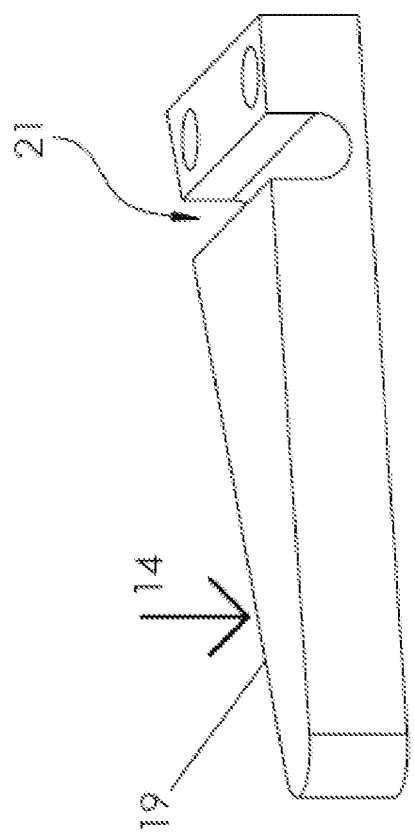
Figure 5D:
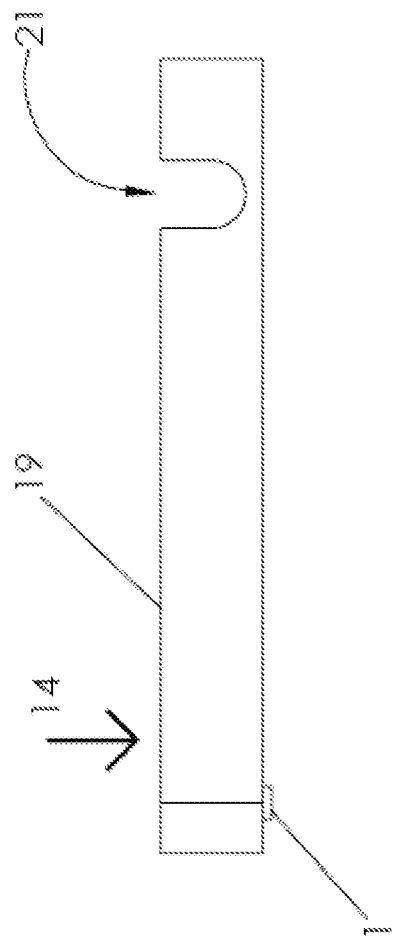
Figure 5E:
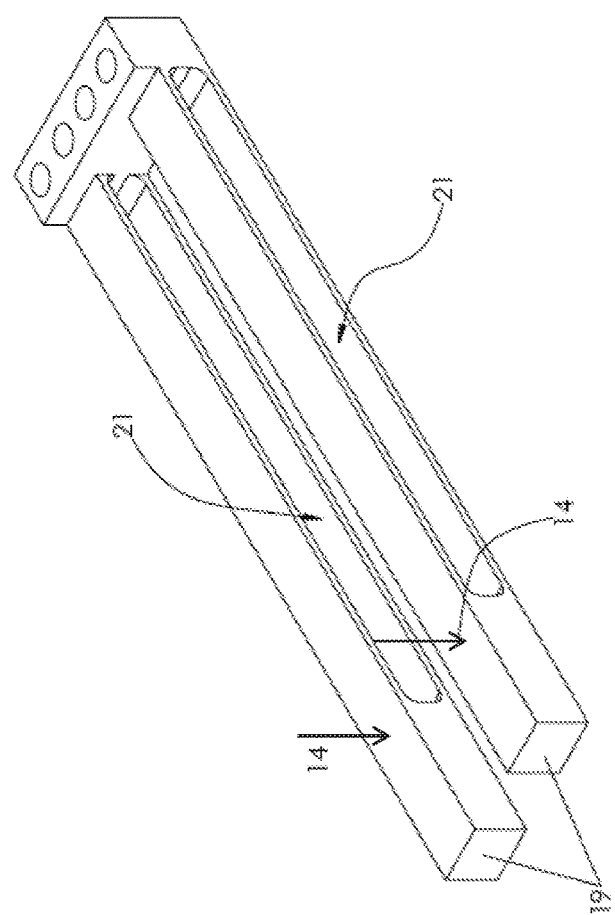
Figure 5F:
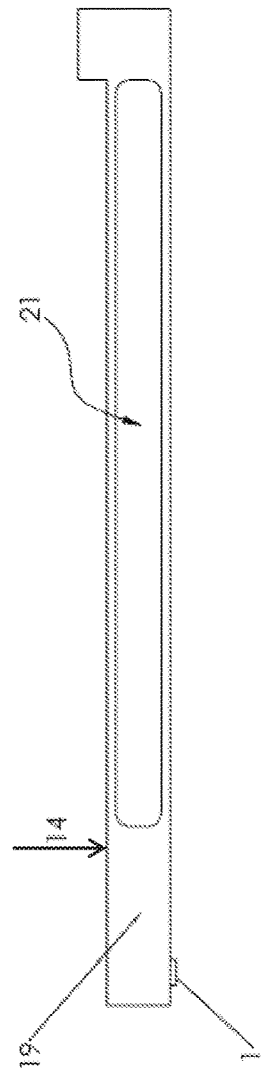

Another embodiment of the stylus load transfer mechanism 5 is a flexure stylus load transfer mechanism 19, as shown in FIGS. 5A-5F. The flexural stylus load transfer mechanism 19 has a geometry that is designed to have a reduced bending stiffness to allow for the coupled stylus 1 to move perpendicular to the substrate surface with minimal engagement load 14. FIGS. 5A-5B show a reduced section 21 along the length of the flexure stylus load transfer mechanism 19. In another embodiment, shown in FIGS. 5C-5D, the reduced section 21 is in the support location. Another embodiment, shown in FIGS. 5E-5F, has a reduced section 21 that includes a hollow cross-section to increase the bending strength of the flexure stylus load transfer mechanism 19, which could be used to allow for eccentric engagement loads 14.

As shown in FIGS. 6A-6C, the load applicator 3 may include a hydraulic system. The styluses 1 are attached to flexure stylus load transfer mechanisms 19, each with unique reduced sections 21. In this embodiment, the load applicator 3 is applying stylus engagement load 14 eccentric with respect to some of the styluses 1, and directly above the stylus 1 for others. Different embodiments of the flexure stylus load transfer mechanisms 19 shown in FIGS. 5A-5F could also be used. The benefit of this embodiment is that there are no moving parts, such as a bearing, which may be required for other embodiments of the stylus load transfer mechanism 5, such as the pivoting stylus load transfer mechanism 15. This embodiment is ideal for high-debris or environmental-exposure test conditions. In addition, the flexure stylus load transfer mechanism 19 may act as a mechanical spring, effectively reducing the force experienced by the styluses 1, if desired. The frictional force generated at the stylus 1 by the apparatus movement 7 is resisted by the flexure stylus load transfer mechanisms 19.

Figure 7A:
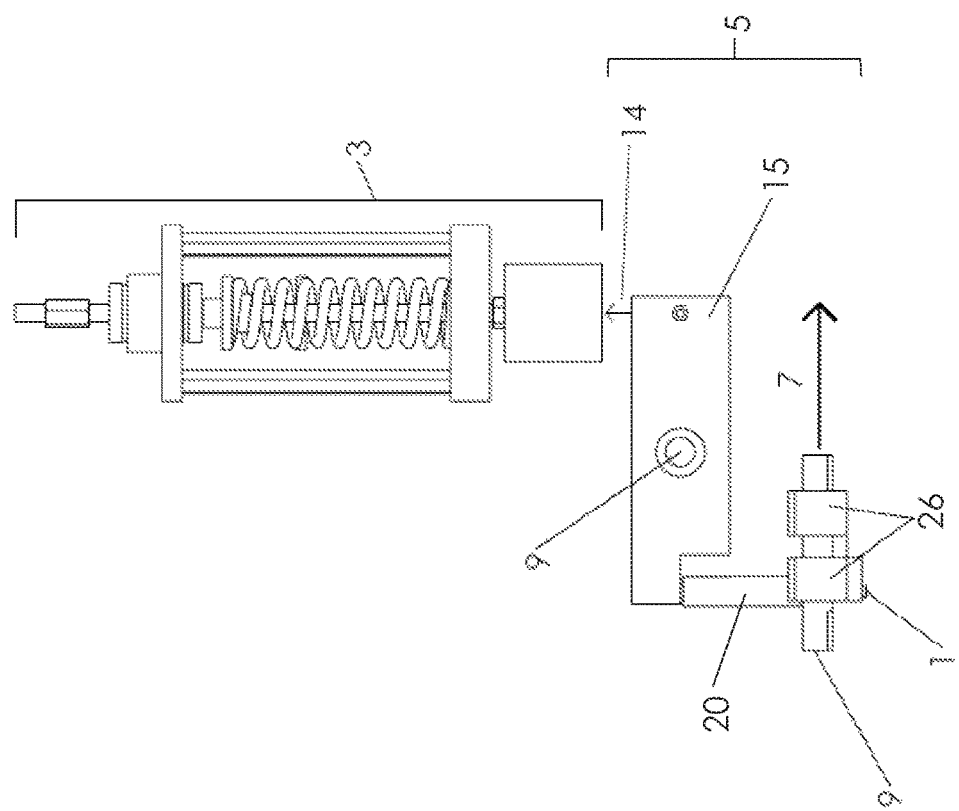
FIGS. 7A-7C depict schematic views of the stylus engagement apparatus of FIG. 1 with a series of stylus load transfer mechanisms according to embodiments of the present invention.
Figure 7B:
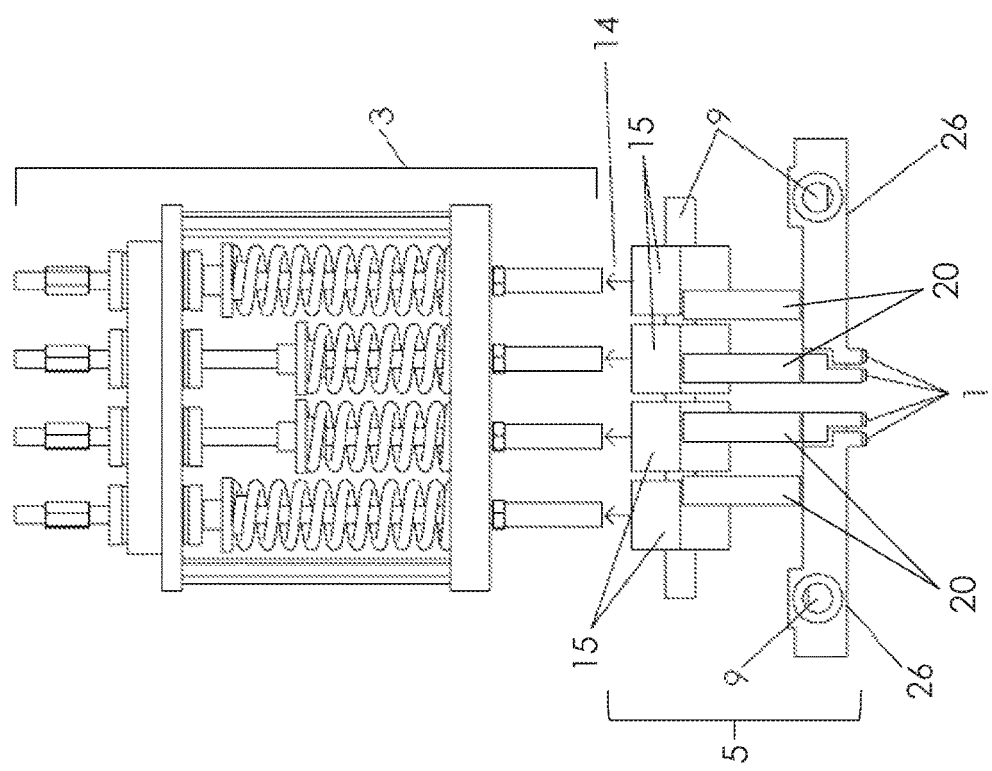
Figure 7C:
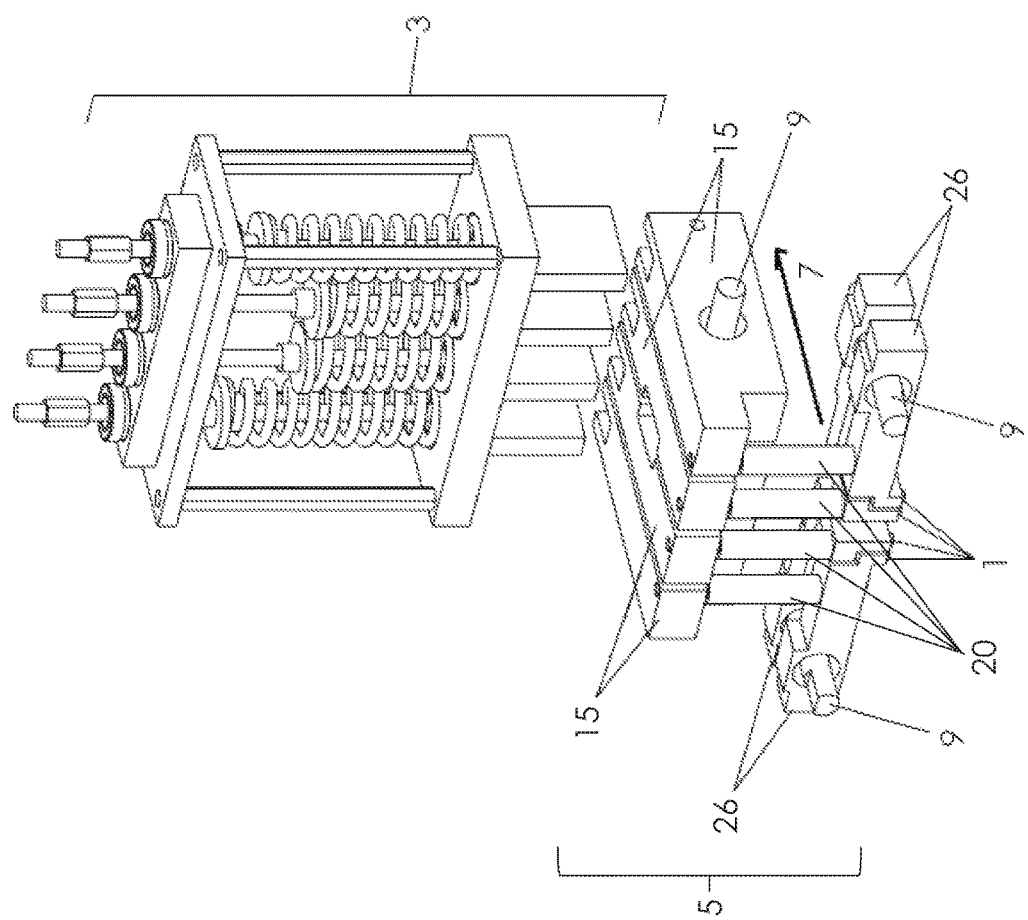

As shown in FIGS. 7A-7C, load applicators 3 may apply loads to the styluses 1 via a series of stylus load transfer mechanisms 5, which includes pivoting stylus load transfer mechanisms 15 and indirect stylus load transfer mechanisms 26. The series of stylus load transfer mechanisms 5 may be connected by a stylus load transfer coupling 20, which is a rigid bar used to transfer engagement loads 14. In FIGS. 7A-7C, there are four styluses 1 shown, although there may be two or more styluses, and the styluses 1 and indirect stylus load transfer mechanisms 26 are contiguous, though they may not be. The use of a series of stylus load transfer mechanisms 5 for each stylus 1 prevents the transmission of frictional forces between the stylus 1 and load applicator 3, similar to the embodiment shown in FIGS. 4A-4B. However, in this embodiment, the frictional and reaction forces are further decoupled, due to the perpendicular axes of coupled stylus load transfer mechanism 5 rotation, which the stylus engagement load 14 is allowed to propagate through unchanged. Another feature of this embodiment is that the pivoting stylus load transfer mechanism 15, that is coupled to the load applicator 3, can be used to amplify the applied engagement load 14 by applying the principles of a lever arm with a fulcrum. An important aspect of this design, as in FIGS. 4A-4B, is that the rotational axes of the indirect stylus load transfer mechanism 26, most closely coupled with the styluses 1, is parallel to the direction of movement 7, as this ensures the contact frictional forces are absorbed and do not influence the applied engagement load 14. However, this would not be the case if the indirect stylus load transfer mechanism 26 did not include a rotational attachment 9, but was a flexure stylus load transfer mechanism 19 that can be configured to be perpendicular to the direction of movement 7, as shown in FIGS. 6A-6C.

The contact mechanics test apparatus as described provides simple to implement and reliable stylus engagement mechanism which is capable of transferring load from a distally located load applicator to two or more styluses, such that the load applicator and styluses do not have to be located immediately adjacent to each other. The apparatus is capable of performing a contact mechanics test with multiple styluses with independent load applicators, such that the styluses may be arranged closely together.

The apparatus as described above is a suitable improvement to both portable and stationary contact mechanics testers. Embodiments allow for faster and more accurate in situ testing of small structures in a field environment with a portable device, as well as faster laboratory testing with a stationary device.

Although the description contains the above specificities, these should not be construed as limiting the scope of the invention, but as merely providing illustrations of some of the presently preferred embodiments of this invention. For example, the apparatus described may be incorporated within an indentation tester, enabling more rapid testing of a sample. The stylus load transfer mechanisms and associated components may be made smaller or larger based on the desired load applicator, engagement load, sliding load, and substrate geometry.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Although the above discussion discloses various exemplary embodiments of the invention, it should be apparent that those skilled in the art may make various modifications that will achieve some of the advantages of the invention without departing from the true scope of the invention.

What is claimed is:

1. An apparatus for performing a contact mechanics test on a substrate, the apparatus comprising:
   (i) two or more styluses, located adjacent to one another, each stylus shaped to deform the substrate at a stylus contact location;
   (ii) at least one load applicator configured to induce a contact load to at least one of the two or more styluses; and
   (iii) a stylus load transfer mechanism, coupled to each stylus and coupled to the at least one load applicator, configured to transfer the contact load from the at least one load applicator to its respective coupled stylus, wherein the stylus load transfer mechanism is a pivoting stylus load transfer mechanism.

2. The apparatus of claim 1, wherein one load applicator is coupled to each stylus load transfer mechanism so that each load applicator induces the contact load to one stylus.

3. The apparatus of claim 1, wherein one or more coupled components are contiguous, wherein the coupled components include:
   (i) one stylus and the at least one load applicator,
   (ii) the at least one load applicator and one stylus load transfer mechanism, and/or
   (iii) one stylus and one stylus load transfer mechanism.

4. The apparatus of claim 1, wherein the at least one load applicator is situated distally from the two or more styluses.

5. The apparatus of claim 1, wherein the stylus load transfer mechanism is a lateral extension coupled to its respective stylus.

6. The apparatus of claim 1, further comprising a rotational attachment, coupled to two or more adjacent pivoting stylus load transfer mechanisms, configured to provide an axis of rotation for the adjacent pivoting stylus load transfer mechanisms.

7. The apparatus of claim 1, further comprising a load splitting mechanism, coupled to the at least one load applicator and two or more stylus load transfer mechanisms, configured to transfer the contact load from the at least one load applicator to the two or more stylus load transfer mechanisms.

8. The apparatus of claim 1, further comprising an indirect stylus load transfer mechanism, coupled to each stylus load transfer mechanism, configured to transfer the contact load from the at least one load applicator to the respective stylus coupled to its respective stylus load transfer mechanism.

9. The apparatus of claim 1, wherein the at least one load applicator includes an hydraulic system.

10. The apparatus of claim 1, wherein the at least one load applicator includes a pneumatic system.

11. The apparatus of claim 1, wherein the at least one load applicator includes a mechanical spring system.

12. The apparatus of claim 1, wherein the at least one load applicator includes a linear actuator.

13. The apparatus of claim 1, wherein the pivoting stylus load transfer mechanism includes a rotation axis that is configured parallel and/or perpendicular to a direction of movement of the two or more styluses during the contact mechanics test.

14. An apparatus for performing a contact mechanics test on a substrate, the apparatus comprising:
   (i) two or more styluses, located adjacent to one another, each stylus shaped to deform the substrate at a stylus contact location;
   (ii) at least one load applicator configured to induce a contact load to at least one of the two or more styluses; and
   (iii) a stylus load transfer mechanism, coupled to each stylus and coupled to the at least one load applicator, configured to transfer the contact load from the at least one load applicator to its respective coupled stylus, wherein the stylus load transfer mechanism is a flexure stylus load transfer mechanism configured to allow for movement of its respective coupled stylus perpendicular to a surface of the substrate.

15. An apparatus for performing a contact mechanics test on a substrate, the apparatus comprising:
   (i) two or more styluses, located adjacent to one another, each stylus shaped to deform the substrate at a stylus contact location;
   (ii) at least one load applicator configured to induce a contact load to at least one of the two or more styluses;
   (iii) a stylus load transfer mechanism, coupled to each stylus and coupled to the at least one load applicator, configured to transfer the contact load from the at least one load applicator to its respective coupled stylus; and
   (iv) a load splitting mechanism, coupled to the at least one load applicator and two or more of the stylus load transfer mechanisms, configured to transfer the contact load from the at least one load applicator to the two or more stylus load transfer mechanisms.

16. The apparatus of claim 15, wherein the stylus load transfer mechanism is a pivoting stylus load transfer mechanism, the apparatus further comprising a rotational attachment, coupled to two or more adjacent pivoting stylus load transfer mechanisms, configured to provide an axis of rotation for the adjacent pivoting stylus load transfer mechanisms.

17. The apparatus of claim 15, wherein one load applicator is coupled to each stylus load transfer mechanism so that each load applicator induces the contact load to one stylus.

18. The apparatus of claim 15, wherein one or more coupled components are contiguous, wherein the coupled components include:
   (i) one stylus and the at least one load applicator,
   (ii) the at least one load applicator and one stylus load transfer mechanism, and/or
   (iii) one stylus and one stylus load transfer mechanism.

19. The apparatus of claim 15, wherein the stylus load transfer mechanism is a lateral extension coupled to its respective stylus.

20. The apparatus of claim 15, wherein the stylus load transfer mechanism is a pivoting stylus load transfer mechanism that includes a rotation axis that is configured parallel and/or perpendicular to a direction of movement of the two or more styluses during the contact mechanics test.

* * * * *